(12) United States Patent
Son

(10) Patent No.: US 6,283,371 B1
(45) Date of Patent: Sep. 4, 2001

(54) LASER DIODE MODULE OF OPTICAL SCANNER

(75) Inventor: Sang Eun Son, Suwon (KR)

(73) Assignee: Samsung Electro-Mechanics Co., LTD, Kyungki-Do (KR)

( * ) Notice: Subject to any disclaimer, the term of this patent is extended or adjusted under 35 U.S.C. 154(b) by 0 days.

(21) Appl. No.: 09/339,627

(22) Filed: Jun. 24, 1999

(30) Foreign Application Priority Data

Sep. 23, 1998 (KR) .............................. P98-39364

(51) Int. Cl.$^7$ ...................................... G06K 7/10
(52) U.S. Cl. ..................... 235/462.32; 359/826
(58) Field of Search ................. 235/462.32, 462.43; 359/823, 826

(56) References Cited

U.S. PATENT DOCUMENTS

| | | | |
|---|---|---|---|
| 4,514,039 | * 4/1985 | Kawai | 359/826 |
| 5,231,278 | * 7/1993 | Kuo | 235/472 |
| 5,631,776 | * 5/1997 | Weigand et al. | 359/694 |
| 5,943,153 | * 8/1999 | Naiki et al. | 359/210 |
| 5,979,760 | * 11/1999 | Freyman et al. | 235/454 |

FOREIGN PATENT DOCUMENTS

| | | |
|---|---|---|
| 7-306348 | 11/1995 | (JP) . |
| 10-239607 | 9/1998 | (JP) . |

OTHER PUBLICATIONS

Patent Abstract of Japan No. 07306348.
Patent Abstract of Japan No. 10239607.

* cited by examiner

Primary Examiner—Mark Tremblay
(74) Attorney, Agent, or Firm—Darby & Darby

(57) ABSTRACT

A laser diode module of an optical scanner includes a circuit board; a case fastened to the circuit board after its position is adjusted, the case having a laser diode embedded therein; and a slider guide fastened to the case. The slider guide has a barrel shaped; upwardly directed guide surface and a pair of further guide surfaces which are formed at either side of the barrels shaped surface. The three guide surfaces extend generally parallel to a laser beam produced by the diode. A lens holder having a body and a pair of guide pieces is seated on the barrel shaped guide surface of the slider guide such that it can slide thereon is formed with an inserting hole. The pair of guide pieces are on either side of the body and are seated on the pair of further guide surfaces of the slider guide, respectively. A collimator lens is fitted into the inserting hole of the body of the lens holder for shaping laser beams emitted from the laser diode into parallel light beams, and a lens fastener is fitted into the inserting hole of the body of the lens holder for preventing the collimator lens from shaking.

24 Claims, 6 Drawing Sheets

(a)  (b)  (c)

LASER DIODE MODULE OF OPTICAL SCANNER

BACKGROUND OF THE INVENTION

1. Field of the Invention

The present invention relates to an optical scanner, and more particularly, the present invention relates to a lase5r diode module which is a light emitting section for focusing on a photosensitive drum.

2. Description of the Related Art

An optical scanner which is generally applied to a laser printer, as shown in FIGS. 1 and 2, includes a housing 1 in which is disposed a light emitting section, that is, a laser diode module serving as a light source.

The laser diode module comprises a laser diode 3 for generating a laser beam, a collimator lens 4 for shaping laser beams emitted from the laser diode 3 into parallel beams, and a slitted member 5 formed with a rectangular hole 5a for passing therethrough only a portion of shaped parallel light beams.

Along paths of the beams passed through the slitted member 5, there are disposed a cylindrical leans 6 for converging the emitted beams into a sub scanning direction and a polygon mirror 7 having a plurality of reflecting faces for reflecting the beams passed through the cylindrical leans 6 at a predetermined angle of view while being rotated at a high speed.

Also, in front of the polygon mirror 7, there is positioned an f-θ lens, that is, a scanning lens 8 for spotting the beams onto a photosensitive drum 9. The canning lens 8 comprises a toric lens 8a and a focusing leans 8b which is an aspherical lens.

Hereafter, operations of the optical scanner constructed as mentioned above will be described in detail.

If a beam is emitted from the laser diode 3 constituting the laser diode module, the beam is converged into the sub scanning direction while passing through the rectangular hole 5a of the slitted member 5 and the cylindrical lens 6 after being shaped into parallel beams in a horizontal main scanning direction and the vertical sub scanning direction while passing through the collimator lens 4.

The beam converged into the vertical sub scanning direction as described above is reflected at the polygon mirror 7 rotating at a high speed such that it has a predetermined angle and then, is converged into the main scanning direction by the scanning lens 8 comprising the toric lens 8a and the focusing lens 8b, to be focused onto the photosensitive drum 9 thereby to realize a desired picture.

On the other hand, in the optical scanner, because, especially, the laser diode module is varied in assembling positions of respective lenses and conditions of focuses spotted onto the photosensitive drum 9, assembling operations must be performed with a high precision.

FIGS. 3 and 4 illustrate a conventional laser diode module is an assembled state.

The laser diode 3 is positioned on a board 10. A case 11 which is formed at its front part with an internally threaded portion 11a, is coupled to the board 10.

A holder 12 which is formed at its front part with an inserting groove 12a of a predetermined depth, is screwed into the internally threaded portion 11a of the case 11, and the collimator lens 4 is fitted into the inserting groove 12a of the older 12 by a fastener 13.

The slitted member 5 which is formed with the rectangular hole 5a, is coupled to a front portion of the holder 12.

At this time, a spring 14 is interposed between a front surface of the case 10 and a rear surface of the holder 12. The spring 14 functions to elastically bias the holder 12 outward to prevent the holder 12 from shaking by outside shock, etc.

In the laser diode module constructed as mentioned above, an optical axial distance adjustment operation of the collimator leans 4 is implemented by moving the holder 12 into which the collimator lens 4 is embedded, forward and backward along the case 11.

Further, as shown in FIGS. 3(a) through 3(c), an optical axis of the laser diode 3 is adjusted by moving the laser diode 3 which is fastened to the board 10 by fastening screws S leftward, rightward, upward and/or downward about the board 10 while screwing or unscrewing the fastening screws S.

However, the conventional laser diode module suffers from defects as described below.

First, since a multitude of components including the holder 12 into which the collimator lens 4 is embedded, the case 11, fastener 13 for fastening the collimator lens 4 to the holder 12, and the spring 14, are needed, the number of components is increased, whereby manufacturing cost is increased and assembling workability is deteriorated.

Second, because a tool for separately adjusting the holder 12 is needed so as to move the holder 12 forward or backward within the case 11, manufacturing cost is further increased.

Third, although the holder 12 is prevented to some extent from shaking by the spring 14 and the fastener 13, if outside shock continuously acts on the holder 12 or elastic force of the spring 14 is changed after a predetermined period of time the holder 12 is caused to move or shake, whereby the optical axial distance between the collimator lens 4 and the laser diode 3 varies.

Fourth, in the process of threading a circumferential inner surface of the case 11 and circumferential outer surface of the holder 12, a machining error maybe caused, whereby quality of end products cannot be uniformed.

SUMMARY OF THE INVENTION

Accordingly, the present invention has been made in an effort to solve the problems occurring in the related art, and an object of the present invention is to provide a laser diode module of an optical scanner, which enables an optical axial distance adjustment operation between a collimator lens and a laser diode to be easily performed, reduces the number of components, thereby accomplishing cost reduction and improving workability, and allows quality of end products manufactured in large quantities to be uniform thereby elevating reliability.

In order to achieve the above object, according to one aspect of the present intention, there is provided a laser diode module of an optical scanner, comprising: a circuit board; a case fastened to a surface of the circuit board after being moved leftward, rightward, upward and/or downward, the case having a laser diode embedded therein; a slider fastened to a front surface of the case and having a barrel type guide surface which is formed at a center portion when viewed in an optical axial direction of a laser beam and extends in the optical axial direction and pair of flat guide surfaces which are formed at both side portions, respectively, and extend in the optical axial direction, the slider having a shape which is opened upward; a lens holder having a body and a pair of guide pieces, the body being seated on[to] the barrel type guide surface of the slider such that it can slide thereon forward and backward in the optical axial direction and being formed with an inserting hole, the pair of guide pieces being integrally coupled to both side surfaces of the body, respectively, and being seated on[to] the pair of flat guide surfaces of the slider, respectively; a collimator lens fitted into the inserting hole of the body of the lens holder for shaping laser beams emitted from the laser diode into parallel light beams; and a lens fastener fitted into the inserting hole of the body of the lens holder for preventing the collimator lens from shaking, the lens fastener being formed with a slit.

According to another aspect of the present invention, there is provided a laser diode module of an optical scanner, comprising: a circuit board; a case fastened to a surface of the circuit board after being moved leftward, rightward, upward and/or downward, the case having a laser diode embedded therein; a slider fastened to a front surface of the case and having a barrel type guide surface which is formed at a center portion when viewed in an optical axial direction of a laser beam and extends in the optical axial direction and a pair of flat guide surfaces which are formed at both side portions, respectively, and extend in the optical axial direction, the slider having a shape which is opened upward; a lens holder having a body and pair of guide pieces, the body being seated onto the barrel type guide surface of the slider such that it can slide thereon forward and backward in the optical axial direction and being formed with an inserting hole, the pair of guide pieces being integrally coupled to both side surfaces of the body, respectively, and being seated onto the pair of flat guide surfaces of the slider, respectively; a collimator lens fitted into the inserting hole of the body of the lens holder for shaping laser beams emitted from the laser diode into parallel light beams; a lens fastener fitted into the inserting hole of the body of the lens holder for preventing the collimator lens from shaking, the lens fastener being formed with a slit; and an upper cover coupled onto the slider such that it defines a shape which is symmetric with the shape of the slider, for isolating the lens holder, the collimator lens and the lens fastener from the outside.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFERRED EMBODIMENTS

Figure 1:
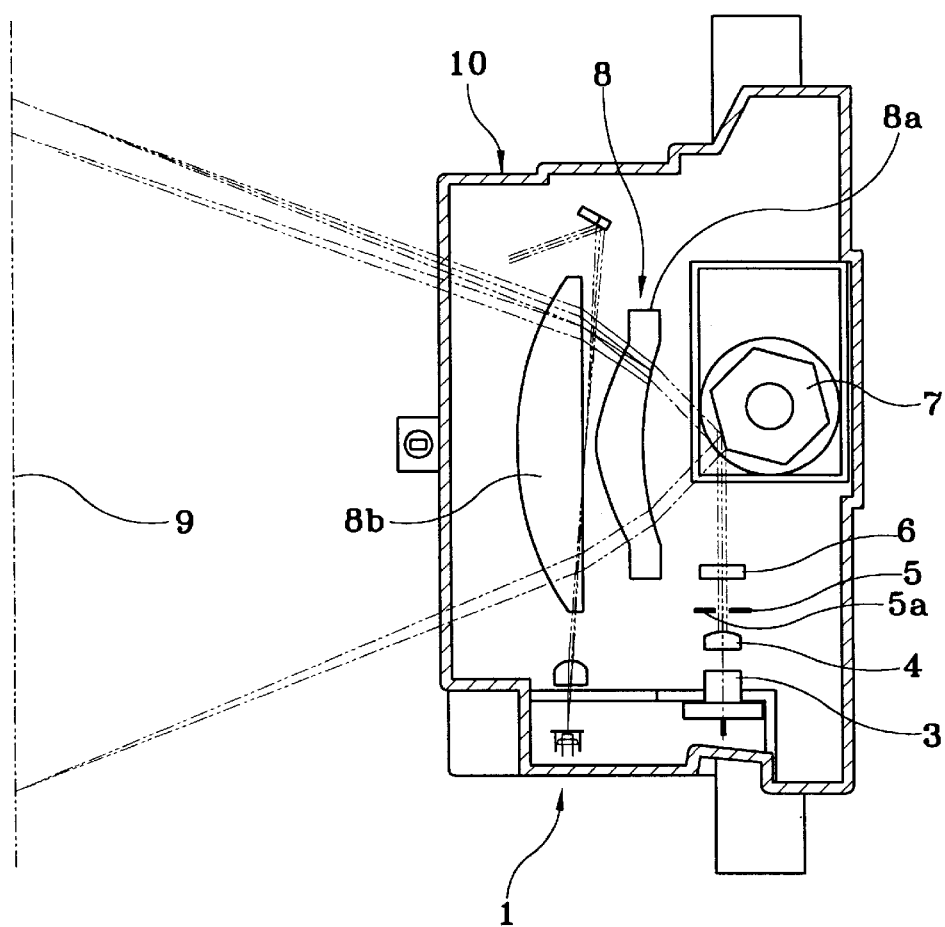
FIGS. 1 and 2 are, respectively, a plan view and front view schematically illustrating a conventional optical scanner.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 5:
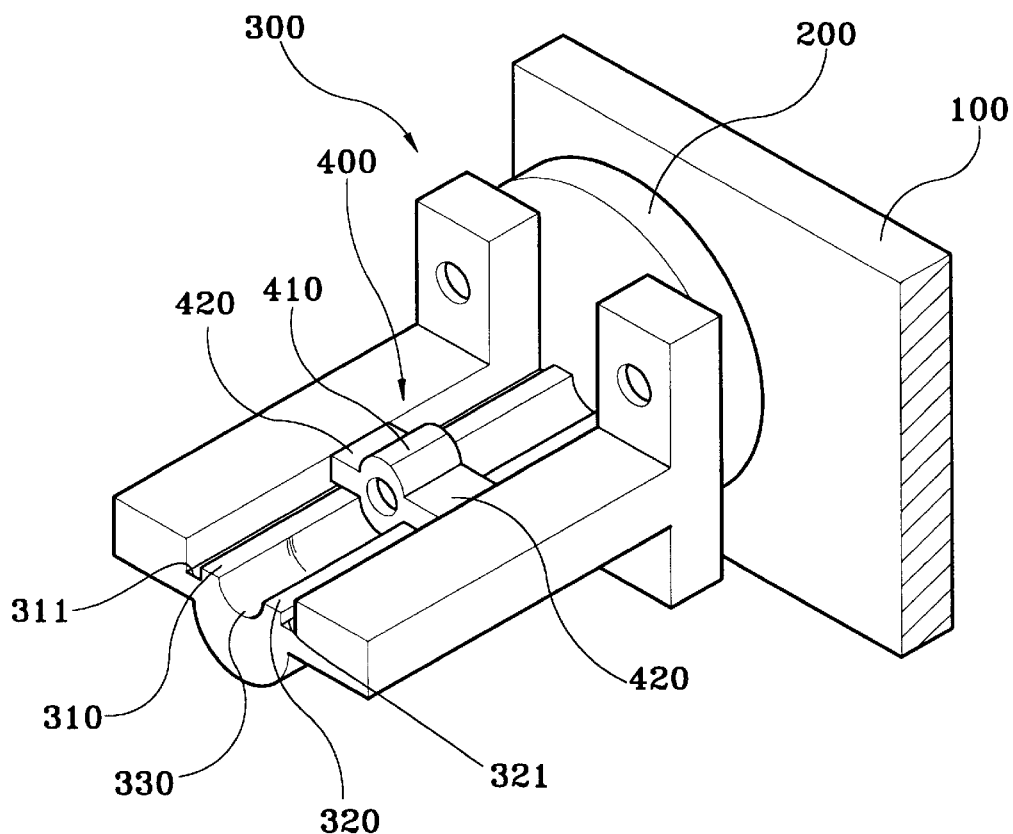
FIG. 5 is a perspective view of a laser diode module in accordance with an embodiment of the present invention.
Figure 6:
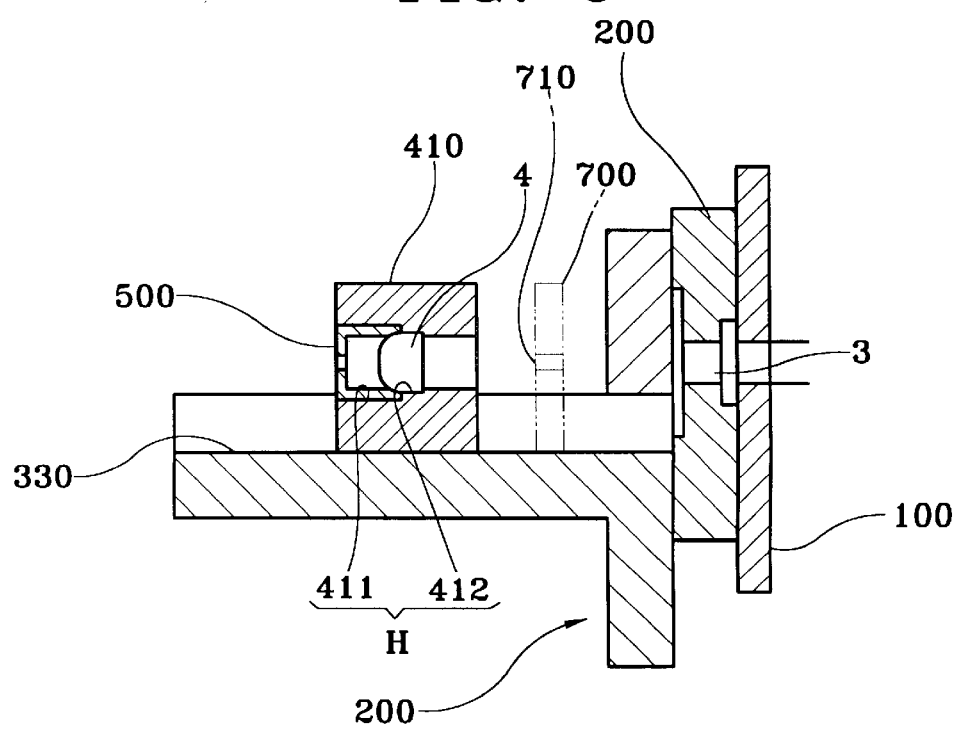
FIG. 6 is a side cross-sectional view of the laser diode module of FIG. 5.

FIG. 5 is a perspective view of a laser diode module in accordance with an embodiment of the present invention; FIG. 6 is a side cross-sectional view of the laser diode module of FIG. 5; FIGS. 7 through 10 are cross-sectional views respectively illustrating main parts of the present invention; and FIG. 11 is a perspective view illustrating another embodiment of the present invention.

Figure 2:
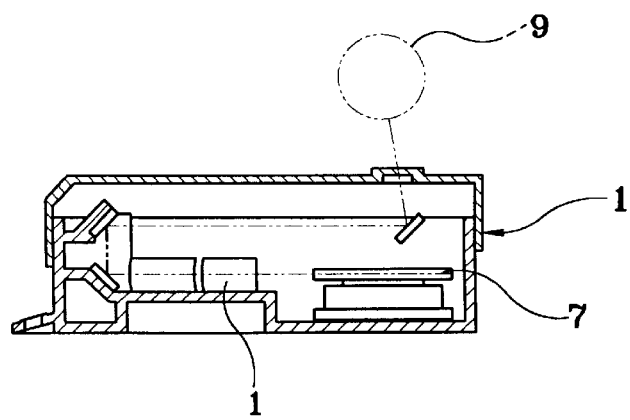

Hereinafter, the same reference numerals will be used to refer to the same or like parts, when compared to FIGS. 1 and 2.

As shown in the drawings, a laser diode module of an optical scanner, according to the present invention, includes largely a circuit board 100, a case 200, a slider 300, a lens holder 400 and a lens fastener 500.

At this time, it is preferred that the slider 300, the lens holder 400 and the lens fastener 500 are made by injection molding of synthetic resin.

This is because [an] errors generated in the process of machining the components which are made of metal can be avoided and because light weight and cost reduction can be accomplished.

The case 200 which has a laser diode 3 disposed therein, is mounted to the circuit board 100 by a plurality of fastening screws such that it can be moved leftward, rightward, upward and/or downward through screwing or unscrewing of the fastening screws.

The slider 300 which is positioned in front of the case 200, is formed, at its left and right sides when viewed in an optical axial direction of a laser beam emitted from the laser diode 3, with a pair of flat guide surfaces 310 and 320, respectively, which extend in the optical axial direction.

In addition, the slider 300 is formed, at a center portion between the pair of flat guide surfaces 310 and 320 which are formed at the left and right sides thereof, with a barrel type guide surface 330 which has a semi-cylindrical curvature and extends in the optical axial direction.

By this configuration, the slider 300 has a shape which is opened upward.

The lens holder 400 has a cylindrical body 410 and left and right guide pieces 420 which are seated on[to] the pair of flat guide surfaces 310 and 320 of the slider 300, respectively.

The cylindrical body 410 of the lens holder 400 has a curvature which is the same as that of the barrel type guide surface 330 of the slider 300, so it may be seated on the barrel type guide surface 330 such that it can slide forward and backward thereon. Specifically, a circumferential inner surface of the cylindrical body 410 of the lens holder 400 defines an inserting hole H.

The inserting hole H is divided, front and rear, into a first inserting hole 411 of a larger diameter and a second inserting hole 412 of a smaller diameter, as shown in FIG. 6.

A collimator lens 4 for shaping laser beams emitted from the laser diode 3 into parallel light beams is inserted and fitted into the second inserting hole 412 which is formed in the cylindrical body 410 of the lens holder 400, and lens fastener 500 for preventing the collimator lens 4 from shaking is inserted and fitted into the first inserting hole 411 of the larger diameter.

On the other hand, when the collimator lens 4 and the lens fastener 500 are inserted and fitted into the first and second inserting holes 411 and 412 of the cylindrical body 410 of the lens holder 400, respectively, it is preferred that they are closely fitted therein so as not to be shaken.

When the collimator lens 4 and thelens fastener 500 are inserted and closely fitted into the first and second inserting holes 411 and 412 of the cylindrical body 410 of the lens holder 400, respectively, as described above, it is considered as an important factor that the collimator lens 4 and the lens fastener 500 are positioned in the first and second inserting holes 411 and 412 at an initial stage, respectively.

In other words, if front outer circumferences of the first and second inserting holes 411 and 412 and rear inner circumferences of the collimator lens 4 and the lens fastener 500 form a sharp edge, it is difficult to accomplish close fits between the first and second inserting holes 411 and 412 and the collimator lens 4 and the lens fastener 500, respectively.

Accordingly, it is preferred that the circumferential inner surface of the cylindrical body 410 of the lens holder 400 which defines the first and second inserting holes 411 and 412 is formed with inclined surfaces c at front end portions of the first and second inserting holes 411 and 412, respectively. The first and second inclined surfaces c are inclined to a predetermined angle to guide insertion of the lens fastener 500 and the collimator lens 4 therein, respectively.

Also, it is necessary that, when the lens fastener 500 is inserted and fitted into the first inserting hole 411 which is formed in the cylindrical body 410 of the lens holder 400, the insertion be smoothly effected and the lens fastener 500 be securely positioned in the first inserting hole 411.

Figure 10:
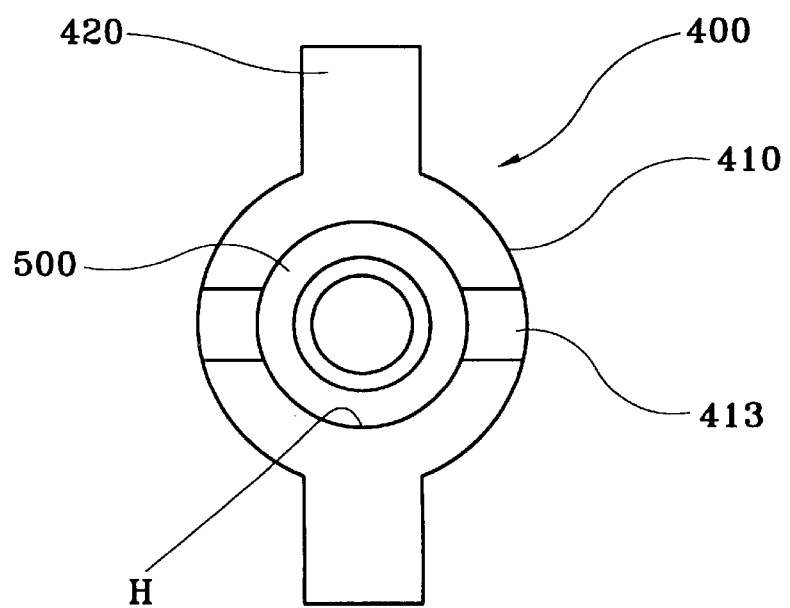
FIG. 10 is a side view of FIG. 9.
Figure 11:
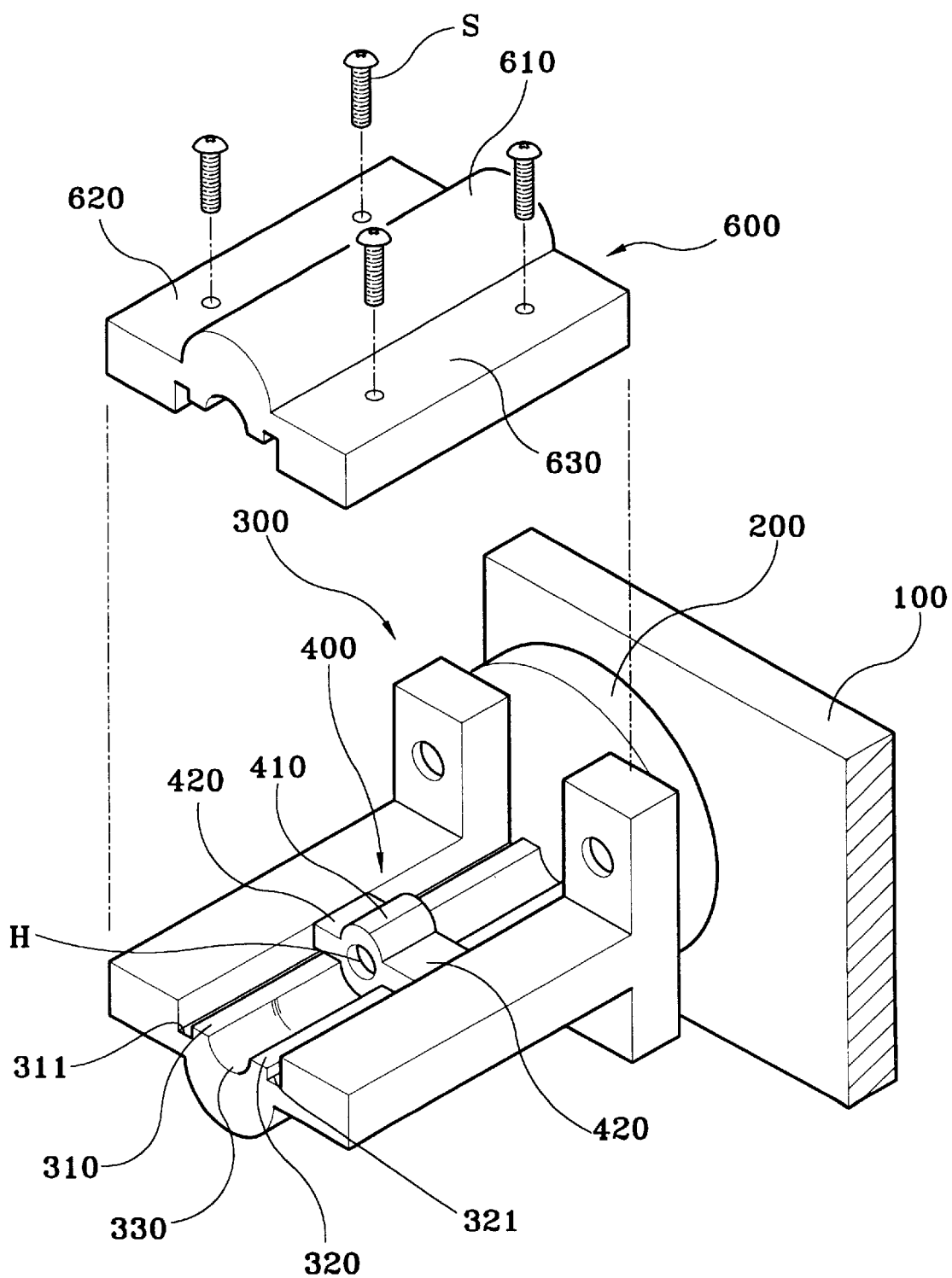
FIG. 11 is a perspective view illustrating another embodiment of the present invention.

For satisfying this condition, as shown in FIG. 10, it is preferred that a pair of open-cut grooves 413 are formed in a circumferential wall of the body 410 of the lens holder 400 which defines the first inserting hole 411, such that they are opposite to each other, they are orthogonal to a line which connects the pair of guide pieces 420 and they are communicated with the first inserting hole 411, to allow the lens fastener 500 to be elastically inserted into the first inserting hole 411.

This is because, by forming in the cylindrical body 410 the pair of open-cut grooves 413 which are communicated with the first inserting hole 411, portions of the cylindrical body 410 in which the open-cut grooves 413 are formed, have a predetermined elasticity, and accordingly, the lens fastener 500 can be elastically inserted therein and supported thereby.

Figure 8:
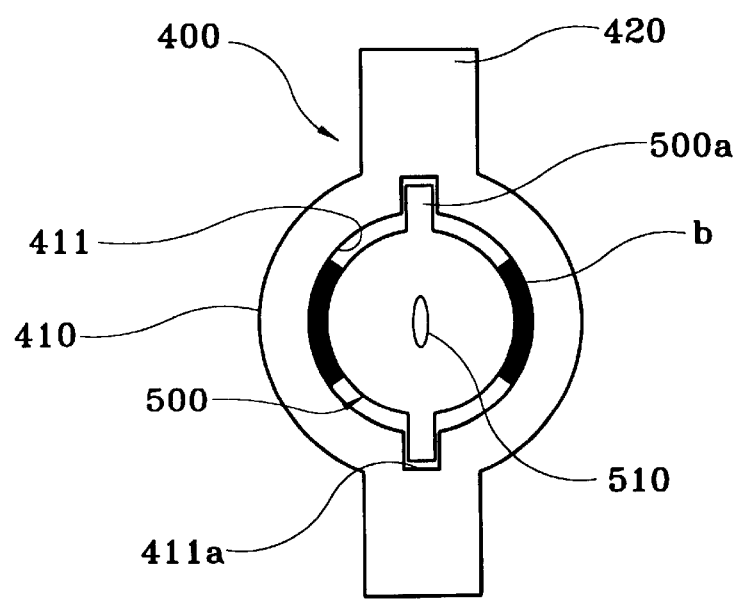
FIG. 8 is a cross-sectional view independently illustrating a state wherein a lens fastener and the lens holder are coupled with each other, in the laser diode module according to the present invention.
Figure 9:
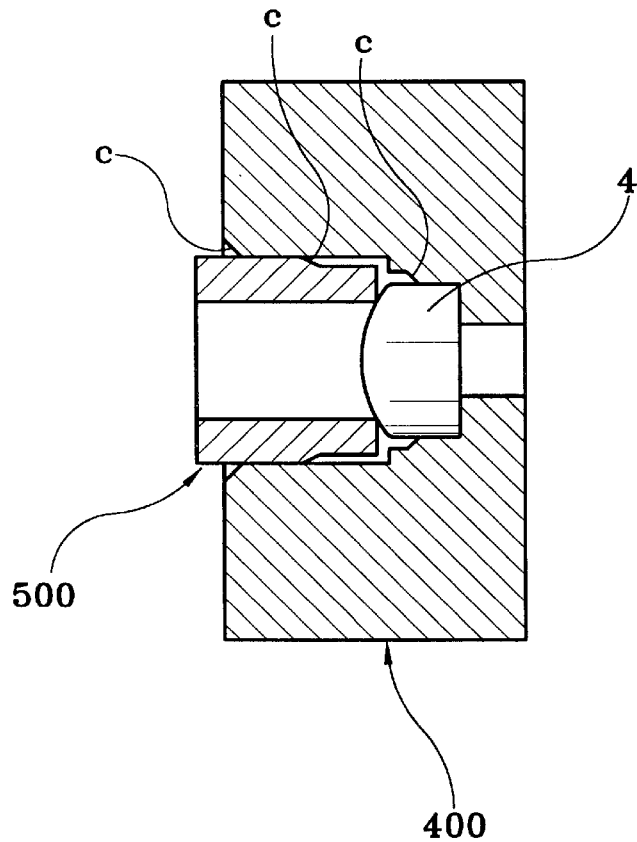
FIG. 9 is a cross-sectional view illustrating a state wherein the lens holder, the lens fastener and a collimator lens are coupled one with another, in the laser diode module according to the present invention.

On the other hand, while it was explained that the aforementioned lens fastener 500 is close fitted into the first inserting hole 411 which is formed in the cylindrical body 410 of the lens holder 400, the present invention is not limited to this particular embodiment, and for example, as shown in FIG. 8, the lens fastener 500 can be fastened to the cylindrical body 410 by adhesive b.

When the lens fastener 500 is fastened to the lens holder 400 by adhesive, the collimator lens 4 which is positioned inside the lens holder 400 must not be polluted by adhesive.

When the lens fastener 500 is positioned in the first inserting hole 411 which is formed in the cylindrical body 410 of the lens holder 400 as described above, it is necessary to limit an initial assembling position of the lens fastener 500.

This is because the lens fastener 500 functions to prevent the collimator lens 4 from shaking, and especially, a front surface of the lens fastener 500 is formed with a rectangular slit 510 for converging laser beams into a sub scanning direction.

Accordingly, only when the rectangular slit 510 of the lens fastener 500 is set to a precise position, is it easy to converge beams into the sub scanning direction through the cylindrical lens 6.

In order to precisely position the lens fastener 500 in the lens holder 400, upper and lower portions of the circumferential outer surface of the lens fastener 500 and upper and lower portions of the circumferential inner surface of the cylindrical body 410 of the lens holder 400 which defines the first inserting hole 411, are formed with two guide projections 500a and two guide grooves 411a, respectively, which can be engaged with each other to define an initial assembling position.

At this time, as shown in FIG. 6 by a dotted line, instead of forming the slit 510 in the lens fastener 500 for converging the laser beams into the sub scanning direction, a slitted member 700 which is formed with a rectangular hole 710 can be separately positioned on the slide 300 between the case 200 and the lens holder 400.

Of course, at this time, the slitted body 700 must be securely fastened onto the slider 300 such that its position is not changed.

On the other hand, as described above, the lens holder 400 must be securely maintained in its position at the time when an optical axial distance adjustment operation between the collimator lens 4 which is inserted and fitted into the second inserting hole 412 and the laser diode 3 is completed.

For doing this, it is preferred that the adhesive b is interposed between the pair of left and right guide pieces 420 of the lens holder 400 and the pair of flat guide surfaces 310 and 320 of the slider 300 onto which the pair of left and right guide pieces 320 are seated, to bond the pair of left and right guide pieces 420 and the pair of guide surfaces 310 and 320 to each other, respectively.

This fastening through bonding is promoted due to the fact that both of the lens holder 400 and the slider 300 are made by injection molding of synthetic resin.

On the other hand, when the pair of guide piece 420 of the lens holder 400 are bonded onto the pair of flat guide surfaces 310 and 320 of the slider 300 by adhesive, an optical axial distance between the set collimator lens 4 and the laser diode 3 can be changed due to the fact that a portion of the adhesive b can leak and flow into the cylindrical body 410 of the lens holder 400 thereby to be cured.

For avoiding this, it is preferred that a pair of adhesive receiving grooves 311 and 321 are formed between the pair of guide pieces 420 and the pair of flat guide surfaces 310 and 320 of the slider 300, that is, on the pair of flat guide surfaces 310 and 320 of the slider 300, in the optical axial direction, for receiving adhesive leaking to a predetermined width.

Also, when the pair of guide pieces 420 and the pair of flat guide surfaces 310 and 320 are bonded to each other, respectively, by adhesive b, because shrinking force is generated in the course of curing of the adhesive b, an optical axial distance between the collimator lens 4 and the laser diode 3 can [vary by] be varied owing to the shrinking force.

Figure 7:
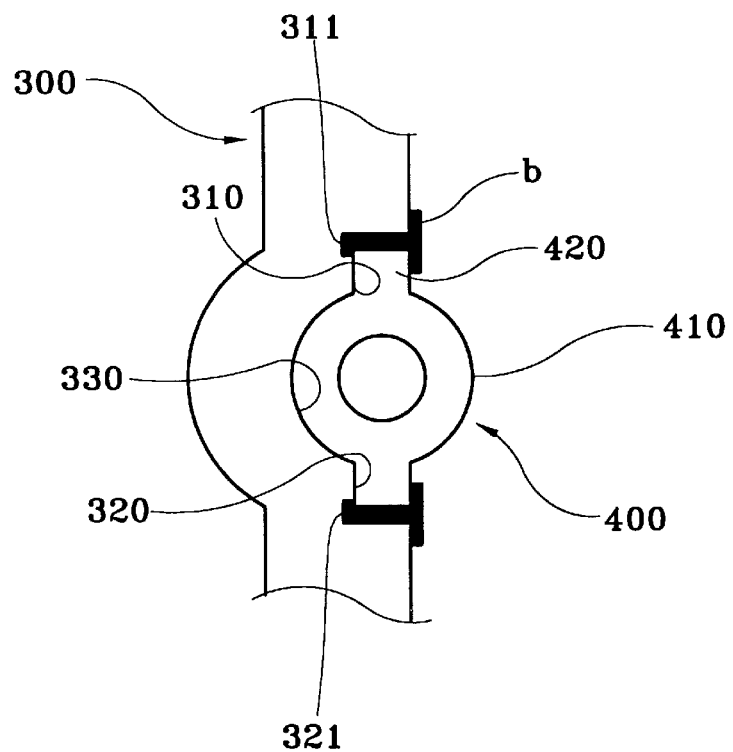
FIG. 7 is a cross-sectional view illustrating a state wherein a lens holder and a slider are bonded to each other, in the laser diode module according to the present invention.

Accordingly, as shown in FIG. 7, it is preferred that the adhesive b interposed between the pair of guide pieces 420 and the pair of flat guide surfaces 310 and 320 of the slider 300 have a T-shaped cross-section.

In other words, by interposing the adhesive b such that it has a T-shaped cross-section, a portion of the adhesive which is exposed to the outside can sufficiently compensate the shrinking force which is generated when the adhesive is cured, whereby the pair of flat guide surfaces 310 and 320 of the slider 300 and the pair of guide pieces 420 which are actually bonded to each other, respectively, are not influenced by the shrinkage of the adhesive b.

Hereinafter, an assembling procedure of the laser diode module according to the present invention, constructed as mentioned above, will be described in detail.

First, initially, an optical axis of the laser diode 3 which is embedded into the case 200, is adjusted in X and Y directions by rotating the case 200 about the circuit board 100 leftward, rightward, upward and downward.

Figure 3:
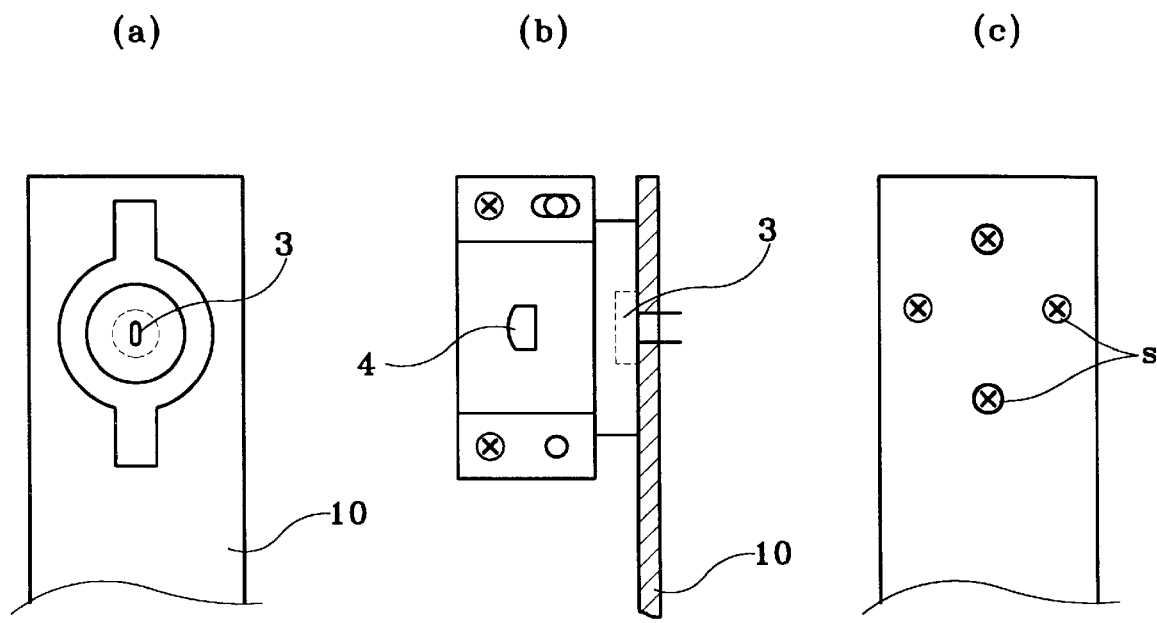
FIGS. 3(a) through 3(c) are, respectively, a left side view, a front view and a right side view of a conventional laser diode module.
Figure 4:
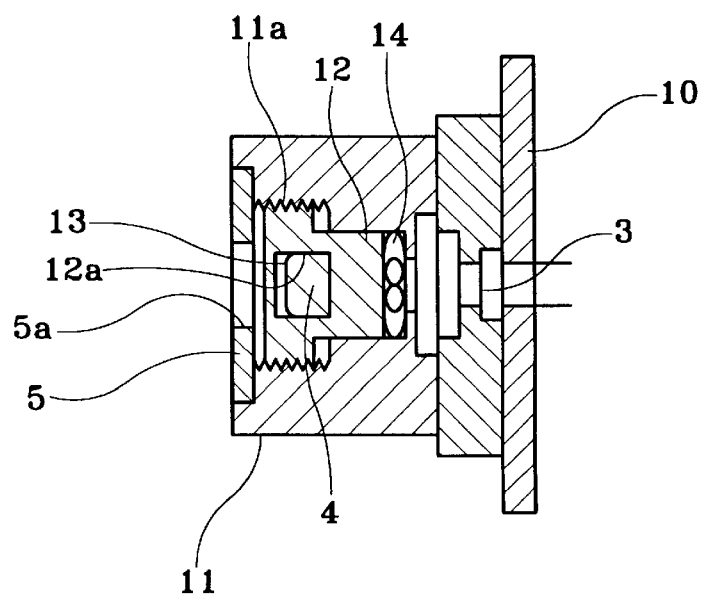
FIG. 4 is a cross-sectional view illustrating a conventional laser diode module which is in an assembled state.

This operation is achieved by screwing or unscrewing the plurality of fastening screws, as in the conventional method shown in FIG. 3.

After the optical axial adjustment operation for the laser diode 3 is completed through the method described above, an optical axial distance adjustment operation between the laser diode 3 and the collimator leans 4 must be preformed.

In doing this, the lens holder 400 into which the collimator lens 4 is embedded is slid along the slider 300, forward and backward, to adjust the optical axial distance between the laser diode 3 and the collimator lens 4.

At this time, the forward and backward sliding movement of the lens holder 400 is possible due to the fact that the cylindrical body 410 of the lens holder 400 is seated onto the barrel type guide surface 330 of the slide 300 such that it can slide forward and backward in the optical axial direction.

On the other hand, the collimator lens 4 is [maintained in a state wherein it is] securely fastened into the lens holder 400 through the lens fastener 500 such that it cannot be moved. This secure fastening of the collimator lens 4 is accomplished not by machining of a separated thread but by bonding through the adhesive b.

At the time when the optical axial distance adjustment operation between the collimator leans 4 and the laser diode 3 is completed by sliding forward and backward the lens holder 400 along the slider 300, the lens holder 400 must be securely fastened to the slider 300.

For this, the pair of guide pieces 420 and the pair of flat guide surfaces 310 and 320 of the slider 300 are bonded to each other by interposing the adhesive b therebetween.

At this time, by the fact that the adhesive b is interposed between the pair of guide pieces 420 and the pair of flat guide surfaces 310 and 320 such that it has a T-shaped cross-section, shaking or moving of the lens holder 400 due to shrinkage of the adhesive b is prevented when the adhesive is cured. Also, by the fact that the pair of receiving grooves 311 and 321 are formed in the pair of flat guide surfaces 310 and 320, respectively, such that they extend in the optical axial direction, the adhesive b is prevented from leaking to the cylindrical body 410 of the leans holder 400.

Accordingly, the lens holder 400 is securely positioned on the slider 300 without shaking.

Since aforementioned operations are implemented in a state wherein an upper part of the slider 300 is opened, by the fact that a worker sees assembled components with the naked eye, an error cannot be generated in the process of assembling the laser diode module.

Another embodiment of the present invention will be described with reference to FIG. 11.

Hereinafter, the same reference numerals will be used to refer to the same or like parts, when compared to FIGS. 5 through 10.

As shown in FIG. 11, a laser diode module of an optical scanner in accordance with this embodiment of the present invention includes largely a circuit board 100, a case 200, a slider 300, a lens holder 400, a lens fastener 500 and an upper cover 600.

At this time, it is preferred that the slider 300, the lens holder 400 and the lens fastener 500 are made by injection molding of synthetic resin.

This is because an error generated in the process of machining the components which are made of metal can be avoided and because light weight and cost reduction can be accomplished.

The case 200 which has a laser diode 3 disposed therein, is mounted to the circuit board 100 by a plurality of fastening screws such at it can be moved leftward, rightward, upward and/or downward through screwing or unscrewing of the fastening screws.

The slider 300 which is positioned in front of the case 200, is formed, at its left and right sides when viewed in an optical axial direction of a laser beam emitted from the laser diode 3, with a pair of flat guide surfaces 310 and 320, respectively, which extend in the optical axial direction.

In addition, the slider 300 is formed, at a center portion between the pair of flat guide surfaces 310 and 320 which are formed at the left and right sides thereof, with a barrel type guide surface 330 which has a semi-spherical curvature and extends in the optical axial direction.

By this configuration, the slider 300 has a shape which is opened upward.

The lens holder 400 has a cylindrical body 410 and left and right guide pieces 420 which are seated onto the pair of flat guide surfaces 310 and 320 of the slider 300, respectively.

The cylindrical body 410 of the leans holder 400 has a curvature which is the same as that of the barrel type guide surface 330 of the slider 300 to be seated onto the barrel type guide surface 330 such that it can slide forward and backward thereon. Specifically, a circumferential inner surface of the cylindrical body 410 of the lens holder 400 defines an inserting hole H.

The inserting hole H is divided, front and rear, into a first inserting hole 411 of a larger diameter and a second inserting hole 412 of a smaller diameter, as shown in FIG. 6.

A collimator lens 4 for shaping laser beams emitted from the laser diode 3 into parallel light beams is inserted and fitted into the second inserting hole 412 which is formed in the cylindrical body 410 of the lens holder 400, and a lens fastener 500 for preventing the collimator lens 4 from shaking is inserted and fitted into the first inserting hole 411 of the larger diameter.

On the other hand, when the collimator lens 4 and the lens fastener 500 are inserted and fitted into the first and second inserting holes 411 and 412 of the cylindrical body 410 of the lens holder 400, respectively, it is preferred that they are closely fitted therein not be shaken.

When the collimator lens 4 and the lens fastener 500 are inserted and closely fitted into he first and second inserting holes 411 and 412 of the cylindrical body 410 of the lens holder 400, respectively, as described above, it is considered as an important factor that the collimator lens 4 and the lens fastener 500 are positioned in the first and second inserting holes 411 and 412 at an initial stage, respectively.

In other words, if front outer circumferences of the first and second inserting holes 411 and 412 and rear inner circumferences of the collimator lens 4 and the lens fastener 500 form a sharp edge, it is difficult to accomplish close fits between the first and second inserting holes 411 and 412 and the collimator lens 4 and the lens fastener 500, respectively.

Accordingly, it is preferred that the circumferential inner surface of the cylindrical body 410 of the lens holder 400 which defines the first and second inserting holes 411 and 412 is formed with inclined surfaces c at front end portions of the first and second inserting holes 411 and 412, respectively. The first and second inclined surfaces c are inclined to a predetermined angle to guide insertion of the lens fastener 500 and the collimator lens 4 therein, respectively.

Also, it is necessary that, when the lens fastener 500 is inserted and fitted into the first inserting hole 411 which is formed in the cylindrical body 410 of the lens holder 400, the insertion be smoothly effected and the lens fastener 500 be securely positioned in the first inserting hole 411.

Each satisfying this condition, as shown in FIG. 10, it is preferred that a pair of open-cut grooves 413 are formed in a circumferential wall of the body 410 of the lens holder 400 which defines the first inserting hole 411, such that they are opposite to each other, they are orthogonal to a line which connects the pair of guide pieces 420 and they are communicated with the first inserting hole 411, to allow the lens fastener 500 to be elastically inserted into the first inserting hole 411.

This is because, by forming in the cylindrical body 410 the pair of open-cut grooves 413 which are communicated with the first inserting hole 411, portions of the cylindrical body 410 in which the open-cut grooves 413 are formed, have a predetermined elasticity, and accordingly, the lens fastener 500 can be elastically inserted therein and supported thereby.

On the other hand, while it was explained that the aforementioned lens fastener 500 is close fitted into the first inserting hole 411 which is formed in the cylindrical body 410 of the lens holder 400, the present invention is not limited to this particular embodiment, and for example, as shown in FIG. 8, the lens fastener 500 can be fastened to the cylindrical body 410 by adhesive b.

When the lens fastener 500 is fastened to the lens holder 400 by adhesive, the collimator lens 4 which is positioned inside the lens holder 400 must not be polluted by adhesive.

When the lens fastener 500 is positioned in the first inserting hole 411 which is formed in the cylindrical body 410 of the lens holder 400 as described above, it is necessary to limit an initial assembling position of the lens fastener 500.

This is because the lens fastener 500 functions to prevent the collimator lens 4 from shaking, and especially, a front surface of the lens fastener 500 is formed with a rectangular slit 510 for converging laser beams into a sub scanning direction.

Accordingly, only when the rectangular slit 510 of the lens fastener 500 is set to a precise position, it is easy to converge beams into the sub scanning direction through the cylindrical lens 6.

In order to precisely position the lens fastener 500 in the lens holder 400, upper and lower portions of the circumferential outer surface of the lens fastener 500 and upper and lower portions of the circumferential inner surface of the cylindrical body 410 of the lens holder 400 which defines the first inserting hole 411, are formed with two guide projections 500a and two guide grooves 411a, respectively, which can be engaged with each other to define an initial assembling position.

On the other hand, as described above, the lens holder 400 must be securely maintained in its position at the time when an optical axial distance adjustment operation between the collimator lens 4 which is inserted and fitted into the second inserting hole 412 and the laser diode 3 is completed.

For doing this, it is preferred that the adhesive b is interposed between the pair of the left and right guide pieces 420 of the lens holder 400 and the pair of flat guide surfaces 310 and 320 of the slider 300 onto which the pair of left and right guide pieces 320 are seated, to bond the pair of left and right guide pieces 420 and the pair of guide surfaces 310 and 320 to each other, respectively.

This fastening through bonding is promoted due to the fact that both of the lens holder 400 and the slider 300 are made by injection molding of synthetic resin.

On the other hand, when the pair of guide pieces 420 of the lens holder 400 are bonded onto the pair of flat guide surfaces 310 and 320 of the slider 300 by adhesive, an optical axial distance between the set collimator lens 4 and the laser diode 3 dan be changed due to the fact that a portion of the adhesive b can leak and flow into the cylindrical body 410 of the lens holder 400 thereby to be cured.

For avoiding this, it is preferred that a pair of adhesive receiving grooves 311 and 321 are formed between the pair of guide pieces 420 and the pair of flat guide surfaces 310 and 20 of the slider 300, that is, on the pair of flat guide surfaces 310 and 320 of the slider 300, in the optical axial direction, for receiving adhesive leaking to a predetermined width.

Also, when the pair of guide pieces 420 and the pair of flat guide surfaces 310 and 320 are bonded to each other, respectively, by adhesive b, because shrinking force is generated in the course of curing the adhesive b, an optical axial distance between the collimator leans 4 and the laser diode 3 can varied owing to the shrinking force.

Accordingly, as shown in FIG. 7, it is preferred that the adhesive b interposed between the pair of guide pieces 420 and the pair of flat guide surfaces 310 and 320 of the slider 300 have a T-shaped cross-section.

In other words, by interposing the adhesive b such that it has a T-shaped cross-section, a portion of the adhesive which is exposed to the outside can sufficiently compensate the shrinking force which is generated when the adhesive is cured, whereby the pair of flat guide surfaces 310 and 320 of the slider 300 and the pair of guide pieces 420 which are actually bonded to each other, respectively, are not influenced by the shrinkage of the adhesive b.

The upper cover 600 has a shape which is symmetrical to the shape of the slider 300 and is coupled onto an upper surface of the slider 300. As shown in FIG. 11, the upper cover 600 is fastened to the slider 300 by a plurality of fastening screws S such that it isolates the lens holder 400, the collimator lens 4 and the lens fastener 500 which are positioned on the slider 300, from the outside.

In other words, the upper cover 600 is formed at a center portion thereof with a barrel type guide surface 610, and is formed with a pair of flat guide surfaces 620 and 630 at both sides of the barrel type guide surface 610.

At this time, it is not necessary to define on an inner surface of the upper cover 600 a separate receiving groove for receiving adhesive. The inner surface of the upper cover 600 is maintained as a flat surface to be airtight coupled with the slider 300.

Hereinafter, an assembling procedure of the laser diode module according to the present embodiment, constructed as mentioned above, will be described in detail.

First, initially, an optical axis of the laser diode 3 which is embedded into the case 200, is adjusted in X and Y directions by rotating the case 200 about the circuit board 100 leftward, rightward, upward and downward.

This operation is achieved by screwing or unscrewing the plurality of fastening screws, as in the conventional method shown in FIG. 3.

When the optical axial adjustment operation for the laser diode 3 is completed through the method described above, an optical axial distance adjustment operation between the laser diode 3 and the collimator leans 4 must be performed.

In doing this, the lens holder 400 into which the collimator lens 4 is embedded is slid along the slider 300, forward and backward, to adjust the optical axial distance between the laser diode 3 and the collimator lens 4.

At this time, the forward and backward sliding movement of the lens holder 400 is possible due to the fact that the cylindrical body 410 of the lens holder 400 is seated on[to] the barrel type guide surface 330 of the slide 300 such that it can slide forward and backward in the optical axial direction.

On the other hand, the collimator lens 4 is maintained in a state wherein it is securely fastened into the lens holder 400 through the lens fastening 500 such that it cannot be moved. This secure fastening of the collimator lens 4 is accomplished not by machining of a separate thread but by bonding through the adhesive b.

At the time when the optical axial distance adjustment operation between the collimator lens 4 and the laser diode 3 is completed by sliding forward and backward the lens holder 400 along the slider 300, the lens holder 400 must be securely fastened to the slider 300.

For this, the pair of guide pieces 420 and the pair of flat guide surfaces 310 and 320 of the slider 300 are bonded to each other by interposing the adhesive b therebetween.

At this time, by the fact that the adhesive b is interposing between the pair of guide pieces 420 and the pair of flat guide surfaces 310 and 320 such that it has a T-shaped cross-section, shaking or moving of the lens holder 400 due to shrinkage of the adhesive b is prevented when the adhesive is cured. Also, by the fact that the pair of receiving grooves 311 and 321 are formed in the pair of flat guide surfaces 310 and 320, respectively, such that they extend in the optical axial direction, the adhesive b is prevented from leaking to the cylindrical body 410 o the lens holder 400.

Accordingly, the lens holder 400 is securely positioned on the slider 300 without shaking.

Since aforementioned operations are implemented in a state wherein an upper part of the slider 300 is opened, since a worker sees assembled components with the naked eye, an error cannot be generated in the process of assembling the laser diode module.

By fastening the upper cover 600 onto the upper surface of the slider 300 using the plurality of screws S at the time when assembling of the respective components is completed, the respective components, that is, the lens holder 400, the collimator lens 4 and the lens fastener 500, etc. are isolated from the outside to be protected from outside shock.

As described above, in a laser diode module of an optical scanner according to the present invention, fixing the position of a collimator lens is performed not by screwing but by fitting and bonding by use of adhesive, so a separate threading process and a screw locking process can be omitted, whereby workability and productivity are improved.

Also, as the number of components is decreased, cost reduction is accomplished and productivity is increased. Further, since a lens holder, a lens fastener and a slider are made by injection molding of synthetic resin, as compared to making them by machining metal as in the conventional art, cost reduction is accomplished and productivity is increased.

Moreover, since it is possible to unify quality of end products, reliability of an optical scanner which adopts the laser diode module of the present invention, is further enhanced.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A laser diode module of an optical scanner, comprising:
   a circuit board;
   a case fastened to a surface of the circuit board in a selected two-dimensional position thereon, the case having a laser diode embedded therein so as to produce a forwardly directed laser beam;
   a slider guide fastened to a front surface of the case and having a barrel shaped, upwardly directed guide surface which extends axially in a front-to-rear direction and a pair of further guide surfaces which are formed at either side of the barrel shaped guide surface and extend in a front-to-rear direction;
   a lens holder having a body and a pair of guide pieces, the body being seated on the barrel shaped guide surface of the slider guide such that it can slide thereon forward and backward and being formed with an inserting hole, the pair of guide pieces being on either side of the body and being seated on the pair of further guide surfaces of the slider guide;
   a collimator lens fitted into the inserting hole of the body of the lens holder for shaping laser beams emitted from the laser diode into parallel light beams; and
   a lens fastener fitted into the inserting hole of the body of the lens holder for preventing the collimator lens from shaking.

2. A laser diode module of an optical scanner as claimed in claim 1, wherein the slider guide, the lens holder and lens fastener are made by injection molding synthetic resin.

3. A laser diode module of an optical scanner as claimed in claim 1, wherein a front surface of the lens fastener is formed with a slit for shaping laser beams which are emitted from the laser diode and pass through the collimator lens.

4. A laser diode module of an optical scanner as claimed in claim 1, wherein a slitted member for shaping laser beams which are emitted from the laser diode is disposed on the slider guide between the lens fastener and the case.

5. A laser diode module of an optical scanner as claimed in claim 1, wherein the lens holder is bonded to the slider by adhesive which is interposed between the pair of guide pieces of the lens holder and the pair of further guide surfaces of the slider, respectively, following a distance adjustment between the collimator lens and the laser diode.

6. A laser diode module of an optical scanner as claimed in claim 5, wherein a pair of receiving grooves into which the adhesive can be received, are formed between lower surfaces of the pair of guide pieces of the lens holder and the pair of further guide surfaces of the slider guide, respectively, such that they extend in a front-to-rear direction.

7. A laser diode module of an optical scanner as claimed in claim 5, wherein the adhesive interposed between the pair of guide pieces of the lens holder and the pair of guide surfaces of the slider, respectively, has a T-shaped cross-section.

8. A laser diode module of an optical scanner as claimed in claim 1, wherein the inserting hole of the lens holder is divided into a first inserting hole and a second inserting hole of a smaller diameter than the first, the collimator lens being inserted into the second inserting hole and the lens fastener being inserted into the first inserting hole.

9. A laser diode module of an optical scanner as claimed in claim 1, wherein a circumferential inner surface of the lens holder which defines the first and second inserting holes is formed with a first inclined surface and a second inclined surface at front end portions of the first and second inserting holes, respectively, the first and second inclined surfaces being inclined to a predetermined angle to guide insertion of the lens fastener and the collimator lens therein, respectively.

10. A laser diode module of an optical scanner as claimed in claim 8, wherein a pair of open-cut grooves are formed in a circumferential wall of the body of the lens holder which defines the first inserting hole, such that they are opposite to each other and they are orthogonal to a line which connects the pair of guide pieces, to allow the lens fastener to be elastically inserted into the first inserting hole.

11. A laser diode module of an optical scanner as claimed in claim 1, wherein the lens fastener is bonded to the lens holder by adhesive which is interposed, on at least one portion, between a circumferential outer surface of the lens fastener and the circumferential inner surface of the body of the lens holder which defines the first inserting hole.

12. A laser diode module of an optical scanner as claimed in claim 11, wherein the circumferential outer surface of the lens fastener and the circumferential inner surface of the body of the lens holder which defines the first inserting hole, are formed with at least one guide projection and at least one guide groove, respectively, which can be engaged with each other to define an initial assembling position.

13. A laser diode module of an optical scanner, comprising:
  a circuit board;
  a case fastened to a surface of the circuit board in a selected two-dimensional position thereon, the case having a laser diode embedded therein so as to produce a forwardly directed laser beam;
  a slider guide fastened to a front surface of the case and having a barrel shaped, upwardly directed guide surface which extends axially in a front-to-rear direction and a pair of further guide surfaces which are formed at either side of the barrel shaped guide surface and extend in a front-to-rear direction;
  a lens holder having a body and a pair of guide pieces, the body being seated on the barrel shaped guide surface of the slider guide such that it can slide thereon forward and backward and being formed with an inserting hole, the pair of guide pieces being on either side of the body and being seated on the pair of further guide surfaces of the slider guide;
  a collimator lens fitted into the inserting hole of the body of the lens holder for shaping laser beams emitted from the laser diode into parallel light beams; and
  a lens fastener fitted into the inserting hole of the body of the lens holder for preventing the collimator lens from shaking; and
  an upper cover coupled onto the slider guide such that it defines a shape which is symmetrical to the shape of the slider guide, for isolating the lens holder, the collimator lens and the lens fastener from the outside.

14. A laser diode module of an optical scanner as claimed in claim 13, wherein the slider guide, the lens holder and the lens fastener are made by injection molding synthetic resin.

15. A laser diode module of an optical scanner as claimed in claim 13, wherein a front surface of the lens fastener is formed with a slitted member for shaping laser beams which are emitted from the laser diode and pass through the collimator lens.

16. A laser diode module of an optical scanner as claimed in claim 13, wherein a slitted member for shaping laser beams which are emitted from the laser diode is disposed on the slider guide between the lens fastener and the case.

17. A laser diode module of an optical scanner as claimed in claim 13, wherein the lens holder is bonded to the slider guide by adhesive which is interposed between the pair of guide pieces of the lens holder and the pair of further guide surfaces of the slider, respectively, following a distance adjustment between the collimator lens and the laser diode.

18. A laser diode module of an optical scanner as claimed in claim 17, wherein a pair of receiving grooves into which the adhesive can be received, are formed between lower surfaces of the pair of guide pieces of the lens holder and the pair of further guide surfaces of the slide guide, respectively, such that they extend in a front-to-rear direction.

19. A laser diode module of an optical scanner as claimed in claim 17, wherein the adhesive interposed between the pair of guide pieces of the lens holder and the pair of guide surfaces of the slider guide, respectively, has a T-shaped cross-section.

20. A laser diode module of an optical scanner as claimed in claim 13, wherein the inserting hole of the lens holder is divided into a first inserting hole and a second inserting hole of a smaller diameter than the first, the collimator lens being inserted into the second inserting hole and the lens fastener being inserted into the first inserting hole.

21. A laser diode module of an optical scanner as claimed in claim 13, wherein a circumferential inner surface of the lens holder which defines the first and second inserting holes is formed with a first inclined surface and a second inclined surface at front end portions of the first and second inserting holes, respectively, the first and second inclined surfaces being inclined to a predetermined angle to guide insertion of the lens fastener and the collimator lens therein, respectively.

22. A laser diode module of an optical scanner as claimed in claim 20, wherein a pair of open-cut grooves are formed in a circumferential wall of the body of the lens holder which defines the first inserting hole, such that they are opposite to each other and generally orthogonal to a line which connects the pair of guide pieces, to allow the lens fastener to be elastically inserted into the first inserting hole.

23. A laser diode module of an optical scanner as claimed in claim 13 wherein the lens fastener is bonded to the lens holder by adhesive which is interposed, on at least one portion, between a circumferential outer surface of the lens fastener and the circumferential inner surface of the body of the lens holder which defines the first inserting hole.

24. A laser diode module of an optical scanner as claimed in claim 23, wherein the circumferential outer surface of the lens fastener and the circumferential inner surface of the body of the lens holder which defines the first inserting hole, are formed with at least one guide projection and at least one guide groove, respectively, which can be engaged with each other to define an initial assembling position.

* * * * *